US009485775B2

(12) United States Patent
Inoue et al.

(10) Patent No.: US 9,485,775 B2
(45) Date of Patent: Nov. 1, 2016

(54) RADIO COMMUNICATION SYSTEM, RADIO BASE STATION AND RADIO COMMUNICATION METHOD

(75) Inventors: Yuki Inoue, Tokyo (JP); Tetsushi Abe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 166 days.

(21) Appl. No.: 14/238,268

(22) PCT Filed: Aug. 15, 2012

(86) PCT No.: PCT/JP2012/070750
§ 371 (c)(1),
(2), (4) Date: Feb. 11, 2014

(87) PCT Pub. No.: WO2013/024870
PCT Pub. Date: Feb. 21, 2013

(65) Prior Publication Data
US 2014/0177466 A1    Jun. 26, 2014

(30) Foreign Application Priority Data
Aug. 15, 2011    (JP) .................................. 2011-177606

(51) Int. Cl.
*H04W 4/00*    (2009.01)
*H04W 72/08*    (2009.01)
(Continued)

(52) U.S. Cl.
CPC ......... *H04W 72/085* (2013.01); *H04B 7/0456* (2013.01); *H04B 7/0469* (2013.01);
(Continued)

(58) Field of Classification Search
None
See application file for complete search history.

(56) References Cited

U.S. PATENT DOCUMENTS

| 6,496,157 B1 | 12/2002 | Mottier |
| 8,457,093 B2 | 6/2013 | Tenny |

(Continued)

FOREIGN PATENT DOCUMENTS

| EP | 2352244 A1 | 8/2011 |
| JP | 2002-50991 A | 2/2002 |

(Continued)

OTHER PUBLICATIONS

International Search Report for corresponding International Application No. PCT/JP2012/070750, mailed Sep. 18, 2012 (4 pages).

(Continued)

*Primary Examiner* — Jutai Kao
(74) *Attorney, Agent, or Firm* — Osha Liang LLP

(57) ABSTRACT

The present invention is designed to execute adequate signaling even when individual user terminals perform communication to support separate types of communication, in MIMO transmission to use antennas having varying antenna configurations depending on the type of communication. A radio base station (200) has an antenna that has varying antenna configurations between at least two types of communication and that can transmit signals to all areas which the radio base station covers, in an antenna configuration to support at least one communication type 1, allocates radio resources to a downlink signal including capacities of a user terminal and a signal type to match a communication type, multiplexes a plurality of reference signals to be used in each communication type on the same resource block, generates precoding weights which allow the antenna to form a number of beams to match the communication type, and multiplies a downlink signal to supply to the antenna by the generated precoding weights.

11 Claims, 10 Drawing Sheets

(51) Int. Cl.
- *H04B 7/06* (2006.01)
- *H04W 72/04* (2009.01)
- *H04B 7/04* (2006.01)
- *H04L 5/00* (2006.01)
- *H04L 25/02* (2006.01)
- *H04L 25/03* (2006.01)

(52) U.S. Cl.
CPC .......... *H04B 7/0617* (2013.01); *H04B 7/0619* (2013.01); *H04L 5/0023* (2013.01); *H04L 5/0048* (2013.01); *H04L 5/0053* (2013.01); *H04L 25/0204* (2013.01); *H04L 25/0228* (2013.01); *H04L 25/03343* (2013.01); *H04L 25/03891* (2013.01); *H04W 72/046* (2013.01); *H04B 7/0639* (2013.01); *H04B 7/0689* (2013.01)

(56) References Cited

U.S. PATENT DOCUMENTS

| | | | |
|---|---|---|---|
| 2010/0194935 A1 | 8/2010 | Okado | |
| 2011/0149886 A1* | 6/2011 | Xu | H04B 7/0628 370/329 |
| 2011/0194551 A1* | 8/2011 | Lee | H04B 7/0626 370/342 |
| 2011/0243017 A1* | 10/2011 | Prasad | H04W 72/085 370/252 |
| 2011/0261773 A1 | 10/2011 | Nogami | |
| 2011/0287776 A1* | 11/2011 | Vujcic | H04W 74/0833 455/452.1 |
| 2011/0293037 A1* | 12/2011 | Liu | H04L 5/001 375/295 |
| 2012/0077504 A1* | 3/2012 | Schadler | H01Q 1/246 455/446 |
| 2012/0188877 A1* | 7/2012 | Chin | H04W 24/10 370/241 |
| 2012/0328031 A1* | 12/2012 | Pajukoski | H04L 25/03942 375/259 |
| 2013/0142271 A1* | 6/2013 | Nilsson | H04B 7/0452 375/267 |
| 2015/0244435 A1* | 8/2015 | Jongren | H04B 7/0426 375/296 |

FOREIGN PATENT DOCUMENTS

| | | |
|---|---|---|
| JP | 2005-136492 A | 5/2005 |
| JP | 2010-183188 A | 8/2010 |
| JP | 2010-521895 A | 6/2013 |
| WO | 2010/055749 A1 | 5/2010 |

OTHER PUBLICATIONS

Dahlman, E. et al.; "4G LTE/LTE-Advanced for Mobile Broadband;" Associated Press; Sep. 10, 2012 (30 pages).

3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9);" Dec. 2009 (18 pages).

Office Action issued in corresponding Japanese Application No. 2011-177606, mailed Apr. 28, 2015 (6 pages).

Office Action issued in corresponding Chinese Application No. 201280039732.0, mailed Mar. 3, 2016 (6 pages).

\* cited by examiner

RADIO COMMUNICATION SYSTEM, RADIO BASE STATION AND RADIO COMMUNICATION METHOD

TECHNICAL FIELD

The present invention relates to a next-generation radio communication system, radio base station, and radio communication method.

BACKGROUND ART

In a UMTS (Universal Mobile Telecommunications System) network, system features that are based on W-CDMA (Wideband Code Division Multiple Access) are maximized by adopting HSDPA (High Speed Downlink Packet Access) and HSUPA (High Speed Uplink Packet Access) for the purposes of improving the spectral efficiency and improving the data rate. For this UMTS network, long-term evolution (LTE) has been under study for the purposes of further increasing high-speed data rates, providing low delay and so on.

In the third-generation system, it is possible to achieve a transmission rate of maximum approximately 2 Mbps on the downlink by using a fixed band of approximately 5 MHz. In a system of the LTE scheme, it is possible to achieve a transmission rate of about maximum 300 Mbps on the downlink and about 75 Mbps on the uplink by using a variable band which ranges from 1.4 MHz to 20 MHz. In the UMTS network, for the purpose of achieving further broadbandization and higher speed, successor systems of LTE have been under study as well (for example, LTE-Advanced (LTE-A)). For example, in LTE-A, there is a plan to expand the maximum system band according to LTE specifications, which is 20 MHz, to approximately 100 MHz. In LTE-A, the maximum number of transmitting antennas according to LTE specifications is planned to be expanded from four antennas to eight antennas.

In a system of the LTE scheme, a MIMO (Multi Input Multi Output) system is proposed (see, for example, non-patent literature 1), as a radio communication technique to transmit and receive data by a plurality of antennas and improve the data rate (spectral efficiency). In the MIMO system, a plurality of transmitting/receiving antennas are provided in the transmitter/receiver, so that different transmission information sequences are transmitted from different transmitting antennas at the same time. On the receiver side, taking advantage of the fact that fading variation is produced differently between the transmitting/receiving antennas, it is possible to increase the data rate (spectral efficiency) by separating and detecting the information sequences that have been transmitted at the same time.

In a system of the LTE scheme, single-user MIMO (SU-MIMO) transmission, in which transmission information sequences that are transmitted from different transmitting antennas at the same time are all directed to the same user, and multiple-user MIMO (MU-MIMO) transmission, in which transmission information sequences that are transmitted from different transmitting antennas at the same time are directed to different users, are defined. In these SU-MIMO transmission and MU-MIMO transmission, on the receiver side, an optimal PMI is selected from a codebook, in which a plurality of amounts of phase/amplitude control (precoding matrix (precoding weights)) to be set in the antennas of the transmitter and PMIs (Precoding Matrix Indicators) that are associated with this precoding matrix, are defined, and this is fed back to the transmitter as channel information (CSI: Channel State Information). On the transmitter side, precoding for each transmitting antenna is performed based on the PMI fed back from the receiver, and transmission information sequences are transmitted.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Generally, a plurality of antennas to be used in MIMO transmission have the same characteristics (directivity, beam width and so on) and are arranged apart. The antennas do not change their characteristics between a plurality of communication types. In such MIMO transmission, the antennas to use are selected depending on the capacities of user terminals, so that, even in the situation where individual user terminals perform communication to support separate types of communication, it is still possible to easily perform signaling for a plurality of user terminals at the same time.

Implementing MIMO transmission by using antennas that have varying antenna configurations depending on the communication type, instead of arranging a plurality of antennas having the same characteristics, is under study. In such MIMO transmission, when individual user terminals perform communication to support separate types of communication, a plurality of antenna configurations coexist at the same time. Consequently, it is not possible to select the antenna configuration to use as in above-described general MIMO transmission, and it is difficult to execute signaling for a plurality of user terminals at the same time.

The present invention has been made in view of the above, and it is therefore an object of the present invention to provide a radio communication system, radio base station and radio communication method that can execute adequate signaling even when, in MIMO transmission using an antenna that has varying antenna configurations depending on the type of communication, individual user terminals perform communication to support separate types of communication.

Solution to Problem

A radio communication system according to the present invention is a radio communication system to include a radio base station to form a cell and user terminals to establish wireless connection with the radio base station, and, in this radio communication system: the radio base station has: an antenna that has varying antenna configurations between at least two types of communication, and that can transmit signals to all areas which the radio base station covers, in an antenna configuration to support at least one communication type 1; a resource allocation control section that allocates radio resources to a downlink signal including capacities of a user terminal and a signal type to match a communication type; a multiplexing section that multiplexes a reference signal on a resource block; a precoding weight generating section that generates a precoding weight which allows the antenna to form a number of beams to match the communication type; and a precoding multiplication section that multiplies a downlink signal to supply to the antenna by the precoding weight generated by the precoding weight generating section; and the user terminal has: a quality measurement section that measures channel quality from the reference signal included in the downlink signal; a feedback information generating section that generates feedback information pertaining to communication quality using the measured channel quality; and a transmission section that feeds back the feedback information generated by the feedback information generating section to the radio base station via an uplink.

A radio base station according to the present invention is a radio base station having: an antenna that has varying antenna configurations between at least two types of communication and that can transmit signals to all areas which the radio base station covers, in an antenna configuration to support at least one communication type 1; a resource allocation control section that allocates radio resources to a downlink signal including capacities of a user terminal and a signal type to match a communication type; a multiplexing section that multiplexes a reference signal on a resource block; a precoding weight generating section that generates a precoding weight which allows the antenna to form a number of beams to match the communication type; and a precoding multiplication section that multiplies a downlink signal to supply to the antenna by the precoding weight generated by the precoding weight generating section.

A radio communication method according to the present invention is a radio communication method for allowing a user terminal to establish wireless connection and communicates with a radio base station, and, in this radio communication method: the radio base station has an antenna that has varying antenna configurations between at least two types of communication and that can transmit signals to all areas which the radio base station covers, in an antenna configuration to support at least one communication type 1; and the radio base station: allocates radio resources to a downlink signal including capacities of a user terminal and a signal type to match a communication type; multiplexes a reference signal on a resource block; generates a precoding weight which allows the antenna to form a number of beams to match the communication type; and multiplies a downlink signal to supply to the antenna by the generated precoding weight; and the user terminal: measures channel quality from the reference signal included in the downlink signal; generates feedback information pertaining to communication quality using the measured channel quality; and feeds back the generated feedback information to the radio base station via an uplink.

According to the present invention, a radio base station has an antenna to have an antenna configuration which has varying antenna configurations between at least two types of communication, and an antenna configuration which can transmit signals in communication type 1, which is at least one of them, to all areas the radio base station covers, multiplexes reference signals on resource blocks and transmits these, and furthermore feeds back channel quality that is measured based on reference signals from user terminals UE, corresponding to each communication type. By this means, in MIMO transmission to use antennas having varying antenna configurations depending on the type of communication, even when individual user terminals perform communication to support separate types of communication, it is still possible to adequately transmit and receive (signaling) reference signals and feedback signals, which are necessary in communication, between the radio base station and user terminals.

Technical Advantage of the Invention

According to the present invention, in MIMO transmission to use antennas that have varying antenna configurations depending on the type of communication, it is still possible to execute adequate signaling even when individual user terminals perform communication to support separate types of communication.

DESCRIPTION OF EMBODIMENTS

Figures 1B, 1C:
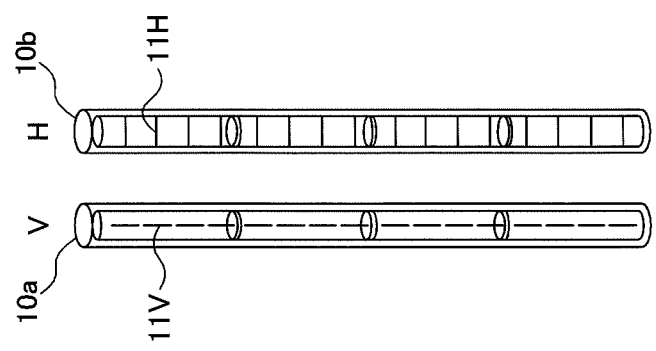
FIG. 1 provides schematic diagrams for explaining N communication types that are provided by an array antenna in a radio base station according to the present embodiment.

As a technique to perform MIMO transmission using antennas having varying antenna configurations depending on the type of communication, the present inventors have proposed the antenna apparatus described in Japanese Patent Application No. 2010-183188. In this antenna apparatus, by changing the antenna element configuration group between a plurality of types of communication, it is possible to make the number of antennas to install smaller than known heretofore, and cover the same area even when the type of communication changes. In MIMO transmission to use this antenna apparatus, when individual user terminals perform communication to support separate types of communication, a plurality of antenna configurations coexist at the same time. The present inventors have focused on the point that, by multiplexing a plurality of reference signals in the same time between varying communication types and transmitting them from a base station apparatus and sending feedback from user terminals in accordance with individual types of communication, it is possible to execute adequate signaling even when, in MIMO transmission to use antennas having varying antenna configurations depending on the type of communication, individual user terminals perform communication to support separate types of communication, and arrived at the present invention.

The radio communication system according to the present invention provides, in a radio base station, an antenna to have an antenna configuration which have varying antenna configurations between at least two types of communication, and an antenna configuration which can transmit signals to all areas which the radio base station covers, in communication type 1, which is at least one of them, a plurality of reference signals to be used in each communication type are multiplexed on the same resource blocks and transmitted, and, channel quality that is measured based on reference signals from user terminals UE, corresponding to each communication type, is fed back. In MIMO transmission to use antennas having varying antenna configurations depending on the type of communication, even when individual user terminals perform communication to support separate types of communication, it is still possible to adequately transmit and receive reference signals and feedback signals that are required in communication, between a radio base station and user terminals.

Now, a configuration of a radio communication system according to an embodiment of the present invention will be described. The radio communication system according to the present embodiment has a radio base station (hereinafter referred to as "base station") which can form transmission beams that can set directivity in vertical directions. This base station has an array antenna that is formed with a plurality of antenna elements that are grouped into at least one group in association with each of N communication types, where N is an integer of 2 or more. Hereinafter, the N communication types that are provided by the array antenna in this base station will be described using FIG. 1. FIG. 1 is a schematic diagram for explaining the N communication types provided by the array antenna in the base station according to the present embodiment.

Figure 1A:
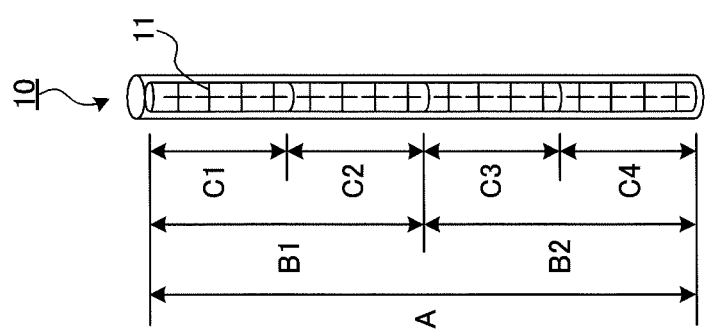

As shown in FIG. 1A, an array antenna 10 is formed with a plurality of antenna elements 11 that are arranged in a line in a vertical direction (in FIG. 1A, sixteen antenna elements 11 are shown as an example). With the present embodiment, the array antenna 10 is formed with a polarized antenna that combines a vertically polarized antenna 10a and a horizontally polarized antenna 10b. However, the present invention is by no means limited to a polarized antenna configuration. FIG. 1B is a conceptual diagram to show the vertically polarized antenna 10a alone, and FIG. 1C is a conceptual diagram to show the horizontally polarized antenna 10b alone. When a polarized antenna is adopted, the individual antenna elements 11 are each formed with a set of a vertically polarized element 11V and a horizontally polarized element 11H.

The first communication type is a type to form one group A with all of the antenna elements 11 constituting the array antenna 10, and form one antenna branch with the whole antenna. The second communication type is a type to divide the antenna elements 11 constituting the array antenna 10 up and down, into two, and form two antenna branches by dividing the antenna elements 11 into two groups, B1 and B2. The third communication type is a type to divide the antenna elements 11 constituting the array antenna 10 up and down, into four, and form four antenna branches by dividing the antenna elements 11 into four groups, C1, C2, C3 and C4. Although the first to third communication types (which may also be referred to as the number of antenna branches) will be shown as examples with the present embodiment, it is equally possible to set an arbitrary number of communication types as adequate, depending on the number of divisions of the antenna elements 11 constituting the array antenna 10 in vertical directions. The maximum number of branches can be selected as adequate, depending on the antenna elements 11.

Among the first to third communication types, the length of antennas to constitute one branch (the number of antenna elements) is the longest in the first communication type. The length of antennas per branch becomes shorter as the number of antenna branches increases. Generally speaking, when beams are formed using an array antenna, it is possible to improve the antenna gain and make the beam width smaller, as the number of antenna elements per branch increases. Consequently, according to the first communication type, the whole antenna is formed with one antenna branch, so that it is possible to shape sharp beams that are directed toward cell edges. Note that the antenna configuration to support this first communication type corresponds to an antenna configuration which can transmit signals to all areas the base station covers.

Figure 2:
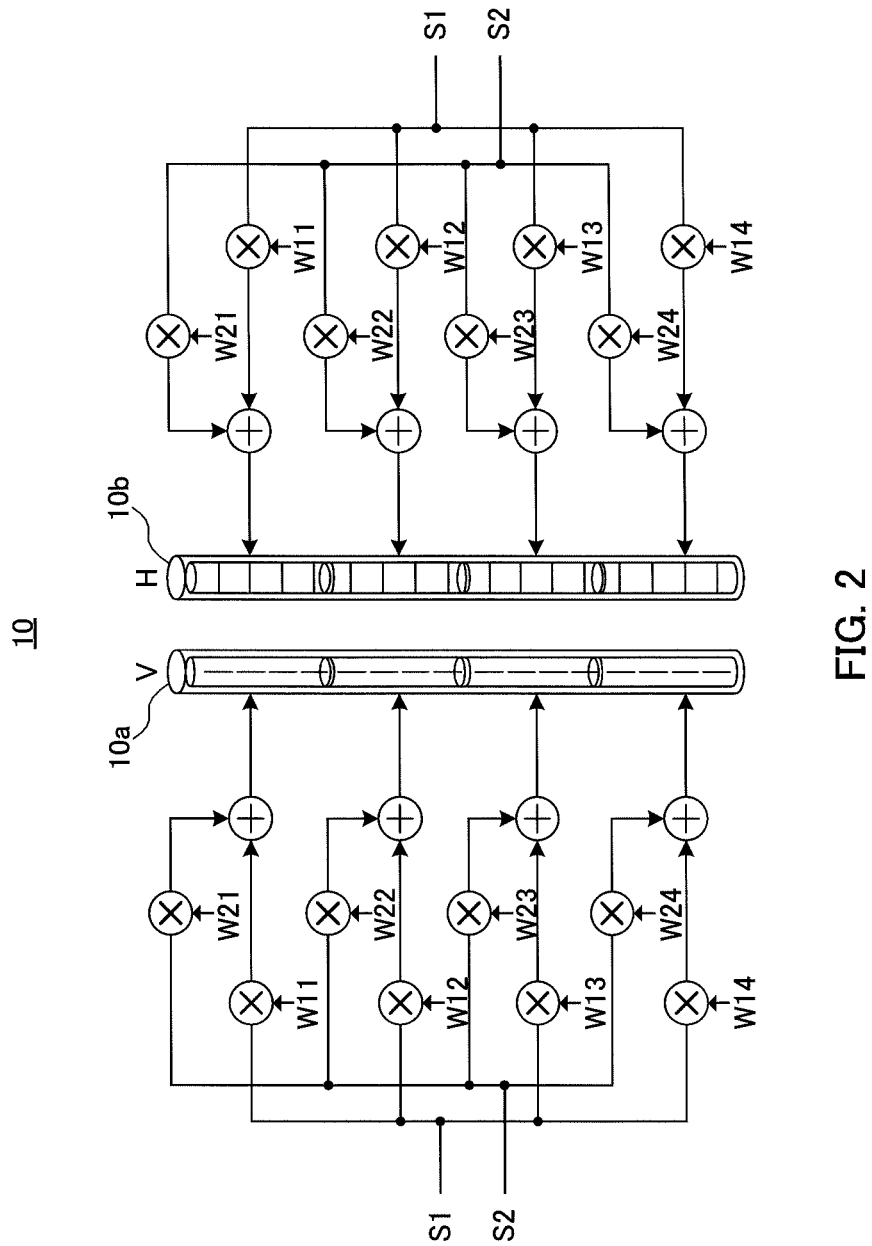
FIG. 2 is a schematic diagram for explaining a weight control for antenna elements constituting an array antenna.

In the array antenna 10, transmission signals, which are multiplied by weights on a per group basis, are input in the antenna elements 11. By controlling the weights, it is possible to form an arbitrary antenna branch with the array antenna 10. In this way, the array antenna 10 has varying antenna configurations for the first to third types of communication. As shown in FIG. 2, transmission signals that are multiplied by the same weight are supplied to the sixteen antenna elements 11 constituting the array antenna 10, in minimum antenna branch units (where the number of antenna elements is four). Although a configuration which can combine two transmission signals S1 and S2 is shown in FIG. 2, the maximum number that can be combined is not limited to this. For example, when providing 8-multiplex MIMO, it is preferable to use a configuration which can combine four transmission signals S1, S2, S3 and S4 (see FIG. 5). The array antenna 10 can form a number of beams to match the number of transmission signals×the number of branches to constitute, at the same time.

Figure 3:
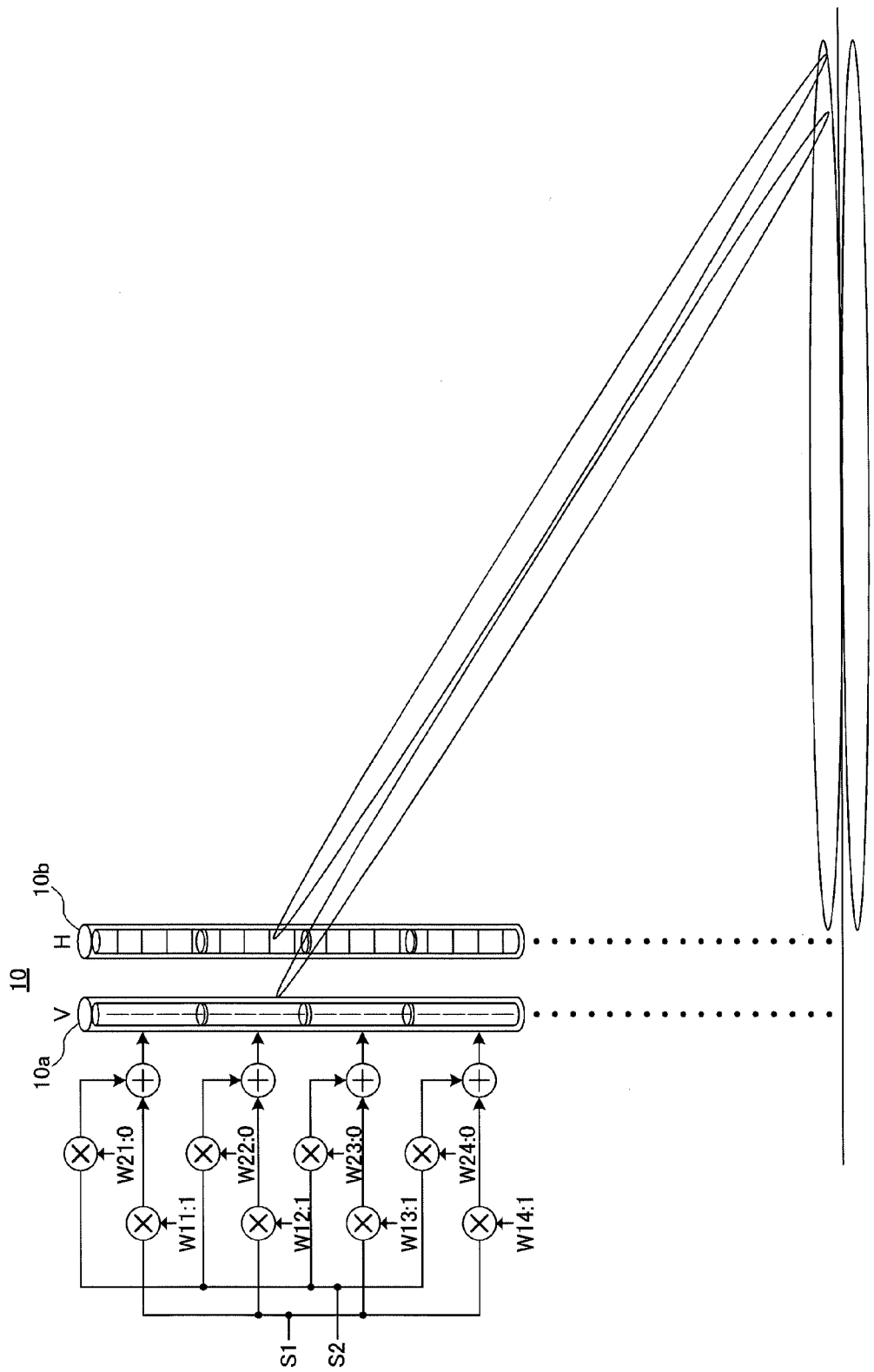
FIG. 3 is a schematic diagram for explaining a weight control for a first communication type.

In the first communication type, as shown in FIG. 3, the array antenna 10 multiplies transmission signal S1 to input in each antenna element 11 constituting one group A, by the same weight W (for example, W11, W12, W13, W14=1, 1, 1, 1). By this means, it is possible to form one beam having a high antenna gain and a narrow beam width. In FIG. 3, transmission signal S1 that is input in the horizontally polarized antenna 10b is omitted for ease of explanation. The vertically polarized antenna 10a and the horizontally polarized antenna 10b each shape one beam, so that, with the array antenna 10, two beams are shaped. Consequently, the first communication type can provide 2-multiplex MIMO transmission. If the receiver supports 2×2 MIMO transmission, 2×2 MIMO transmission can be realized. With a receiver of a one-antenna configuration, it is possible to provide space-frequency transmission diversity by SFBC (Space-Frequency Block Coding) using two antennas. SFBC executes coding in the antenna/frequency domain.

Figure 4:
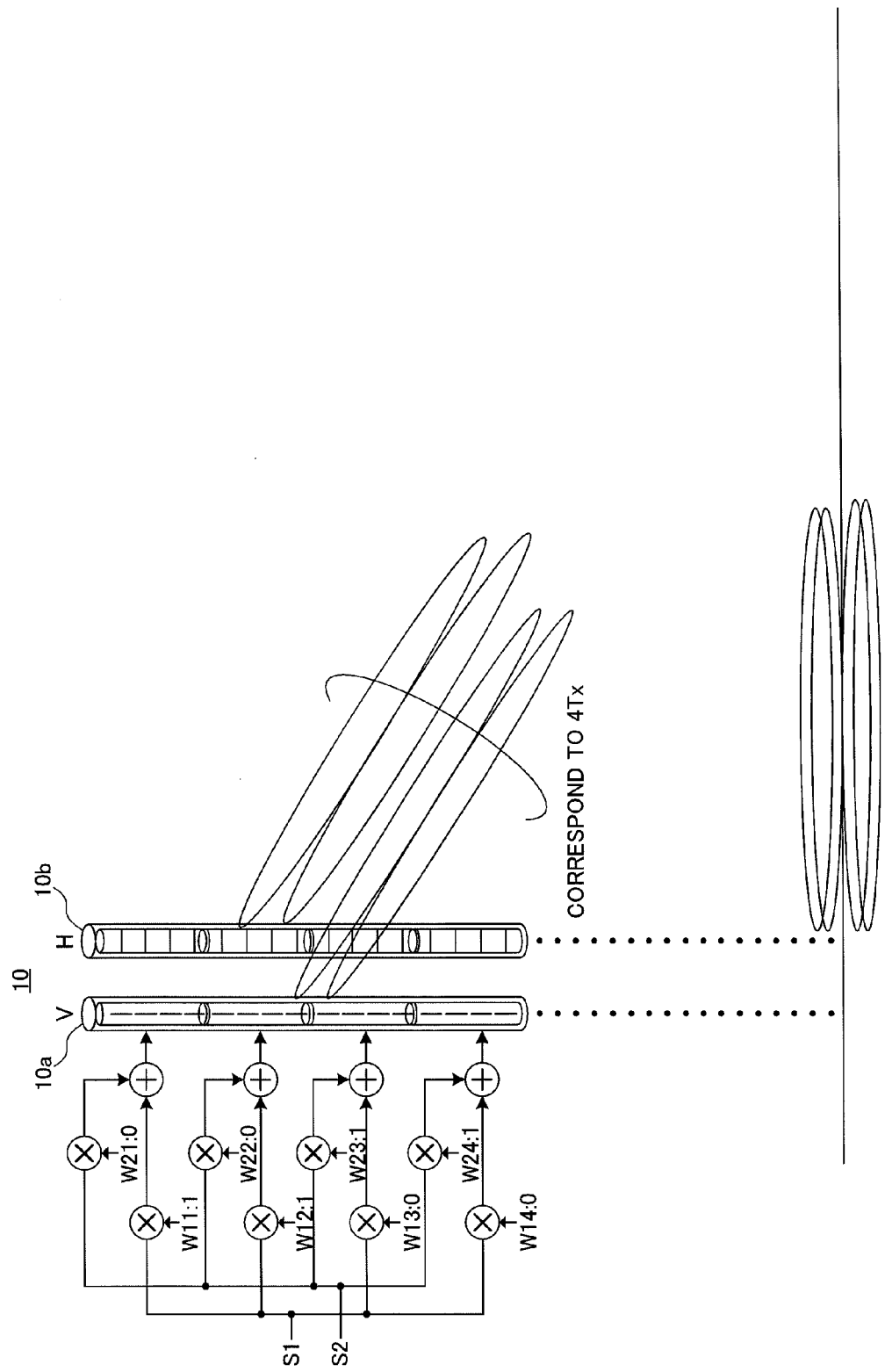
FIG. 4 is a schematic diagram for explaining a weight control for a second communication type.

With the second communication type, as shown in FIG. 4, the array antenna 10 multiplies transmission signal S1 to input in the antenna elements 11 constituting group B1 by weights W (for example, W11, W12, W13, W14=1, 1, 0, 0), and multiplies transmission signal S2 to input in the antenna elements 11 constituting group B2 by weights W (for example, W21, W22, W23, W24=0, 0, 1, 1). By this means, it is possible to shape beam 1 and beam 2 by two antenna branches corresponding to groups B1 and B2. In FIG. 4, transmission signals S1 and S2 to be input in the horizontally polarized antenna 10b are omitted for ease of explanation. The vertically polarized antenna 10a shapes beam 1 and beam 2, and, at the same time, the horizontally polarized antenna 10b shapes beam 1 and beam 2, so that the array antenna 10 is able to shape total four beams in parallel. By directing the four beams that are shaped in parallel toward the same area in a cell, 4-multiplex MIMO transmission is provided.

Figure 5:
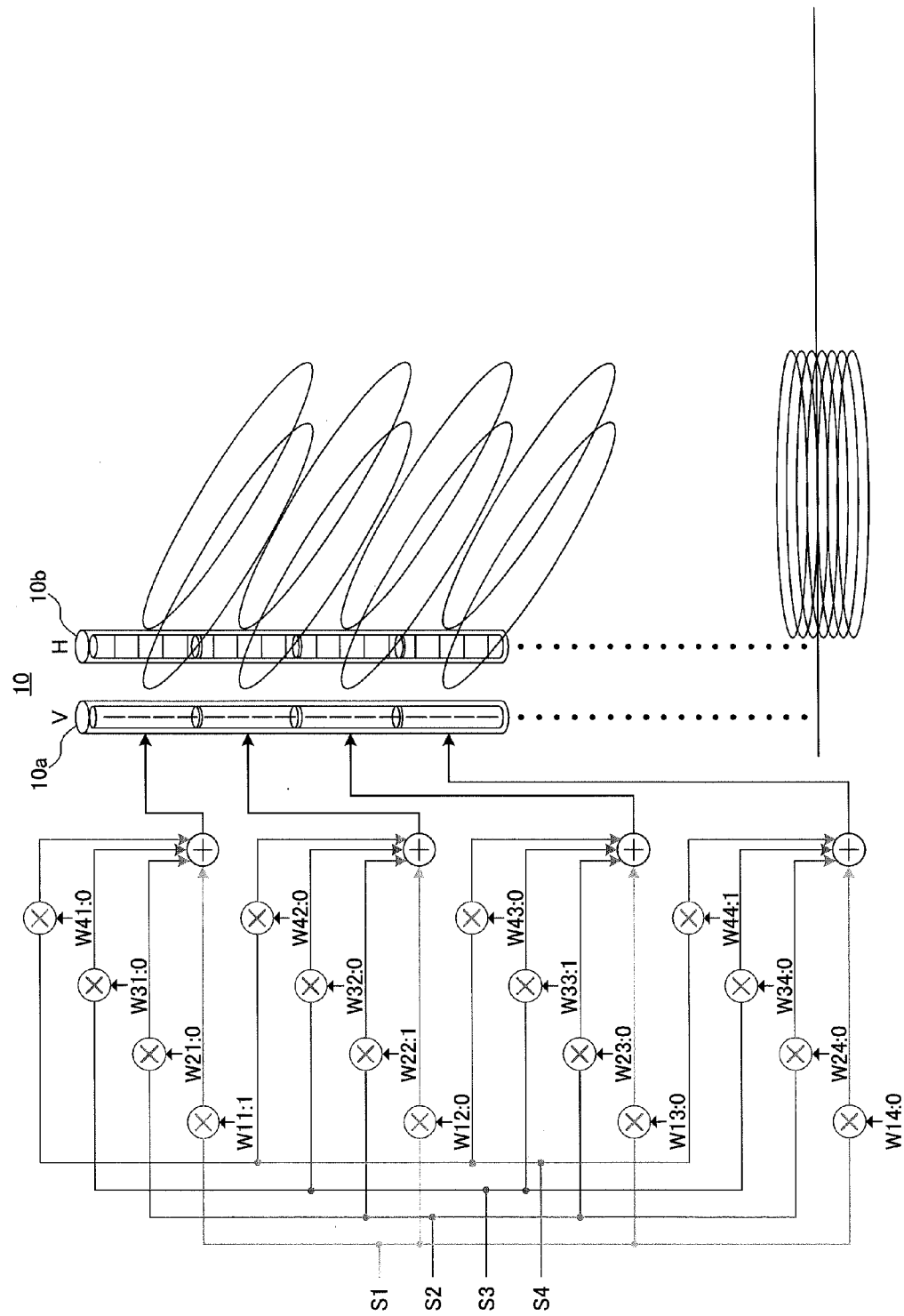
FIG. 5 is a schematic diagram for explaining a weight control for a third communication type.

With the third communication type, as shown in FIG. 5, the array antenna 10 multiplies transmission signal S1 to input in the antenna elements 11 constituting group C1 by weights W (for example, W11, W12, W13, W14=1, 0, 0, 0), and multiplies transmission signal S2 to input in the antenna elements 11 constituting group C2 by weights W (for example, W21, W22, W23, W24=0, 1, 0, 0). At the same time, the array antenna 10 multiplies transmission signal S3 to input in the antenna elements 11 constituting group C3 by weights W (for example, W31, W32, W33, W34=0, 0, 1, 0), and multiplies transmission signal S4 to input in the antenna elements 11 constituting group C4 by weights W (for example, W41, W42, W43, W44=0, 0, 0, 1). By this means, it is possible to shape beam 1 to beam 4 by four antenna branches corresponding to groups C1 to C4. In FIG. 5, transmission signals S1 to S4 to be input in the horizontally polarized antenna 10b are omitted for ease of explanation. The vertically polarized antenna 10a shapes four beams, and, at the same time, the horizontally polarized antenna 10b shapes four beams, so that the array antenna 10 is able to shape total eight beams in parallel. By directing the eight beams that are shaped in parallel toward the same area in a cell, 8-multiplex MIMO transmission is provided.

The base station according to the present embodiment is able to select a mix type (the fourth communication type), which selects the first to third types of communication at the same time. The fourth communication type is implemented by controlling the weight for transmission signals on a per resource element (RE) basis. In LTE and LTE-A, one resource block (RB) is formed with 12 subcarriers×14 OFDM (or SC-FDMA) symbols. One resource element refers to one subcarrier×one OFDM (or SC-FDMA) symbol. Note that the fourth communication type corresponds to a mixed communication type in which at least two communication types, including the first communication type, are selected at the same time.

With the radio communication system according to the present embodiment, it is possible to divide the array antenna 10 into one group or a plurality of groups by controlling the weights for transmission signals to be input in the antenna elements 11. By this means, it becomes possible to select the desired communication type from a plurality of types of communication and transmit various types of signals to user terminals UE.

Next, signaling in the radio communication system according to the present embodiment will be described. In the systems of the LTE scheme and the LTE-A scheme, a CRS (Cell-specific Reference Signal), a CSI-RS (Channel State Information-Reference Signal), and a user-specific DM-RS (Demodulation-Reference Signal) and so on are defined as downlink reference signals. A CRS is transmitted in all downlink subframes, and is placed over the entire downlink frequency band. A CRS is used in channel estimation for downlink coherent detection. A CSI-RS is a reference signal for channel information measurement, and is used to measure CSI (CQI, PMI, rank). A user-specific DM-RS is transmitted in resource blocks that are allocated for downlink shared channel (DL-SCH) transmission to individual user terminals UE. A user-specific DM-RS is a user-specific demodulation reference signal which can be used in channel estimation for coherent detection of the downlink shared channel.

In the systems of the LTE scheme and the LTE-A scheme, a physical broadcast channel (PBCH) to transmit a synchronization signal (SS) that is used in a cell search to detect the cell which a user terminal UE should connect with, and the system information (SIB (System Information Block) and MIB (Master Information Block)) that is necessary after the cell search, is defined. Furthermore, the systems of the LTE scheme and the LTE-A scheme define a PDCCH (Physical Downlink Control Channel) for transmitting downlink control signals, and a PUCCH (Physical Uplink Control Channel) for transmitting uplink control signals. Furthermore, the systems of the LTE scheme and the LTE-A scheme define a PDSCH (Physical Uplink Control Channel) for transmitting downlink data (including part of the control signals), and a PUSCH (Physical Uplink Shared Channel) for transmitting uplink data (including part of the control signals).

The base station to constitute the radio communication system according to the present embodiment determines the type of communication depending on the types of signals such as these to transmit to user terminals UE, and the capacities of the user terminals UE. The capacities of a user terminal UE that are examined when the type of communication is determined include, for example, whether or not the user terminal UE is a user terminal to support Release 8 (Rel. 8), Release 9 (Rel. 9), Release 10 (Rel. 10) or Release 11 (Rel. 11) LTE.

Figure 6A:
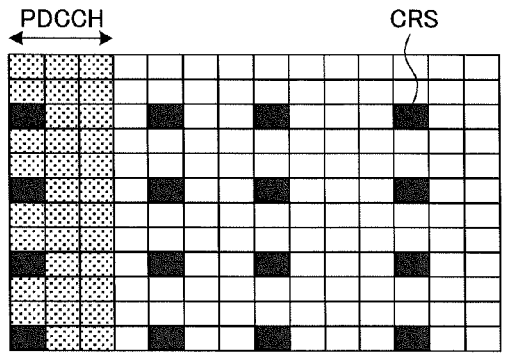
FIG. 6 provides diagrams showing the reference signal arrangement in resource blocks under the first, second, third and fourth communication types and mixed operation.

For example, the base station transmits, in the first communication type, downlink signals including a CRS and a PDCCH for a user terminal supporting Rel. 8, Rel. 9, Rel. 10 or Rel. 11 LTE, and at least one of MIB/SIB/paging information. A user terminal UE that desires to connect with a cell must always receive a synchronization signal (SS) and a physical broadcast channel (PBCH), and therefore the synchronization signal (SS) and the physical broadcast channel (PBCH) have to encompass all in the area as their coverage. By transmitting these downlink signals in beams supporting communication type 1, it becomes possible to transmit these downlink signals to all user terminals UE in the area. Also, the base station transmits, in the first communication type, a PDSCH for a user terminal that supports Rel. 8 LTE and that supports 2×2 MIMO transmission. FIG. 6A shows the CRS configuration that is assigned to the beam supporting the first communication type.

Figure 6B:
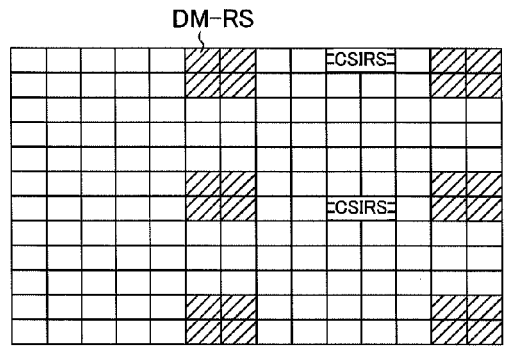

The base station transmits, in the second communication type, a downlink signal including a CSI-RS for four antenna ports, for a user terminal that supports Rel. 10 LTE and that supports transmission mode 9. By transmitting this downlink signal by a beam to support communication type 2, it becomes possible to transmit a CSI-RS for four antenna ports to a user terminal UE effectively, by making maximal use of the capacities of the user terminal UE. Also, the base station transmits, in the second communication type, a PDSCH and a DM-RS for a user terminal that supports Rel. 10 LTE and that supports transmission mode 9. FIG. 6B shows the reference signal (CSI-RS) configuration to be assigned to the beam that supports the second communication type.

Figure 6C:
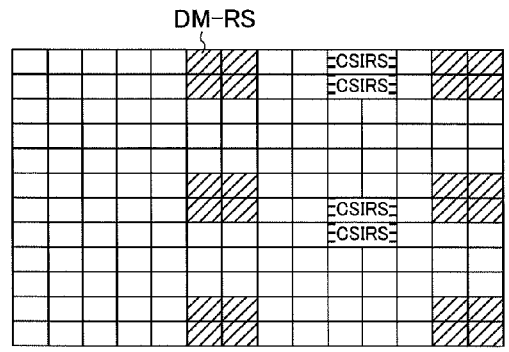

The base station transmits, in the third communication type, for example, a downlink signal including a CSI-RS for eight antenna ports for a user terminal that supports Rel. 10 LTE and that supports 8×8 MIMO transmission. By transmitting this downlink signal by a beam to support communication type 3, it becomes possible to transmit a CSI-RS for eight antenna ports to a user terminal UE effectively, by making maximal use of the capacities of the user terminal UE. Also, the base station transmits, in the third communication type, a PDSCH and a DM-RS for a user terminal that supports Rel. 10 LTE and that supports transmission mode 9. FIG. 6C shows the reference signal (CSI-RS) configuration to be assigned to the beam that supports the third communication type.

Figure 6D:
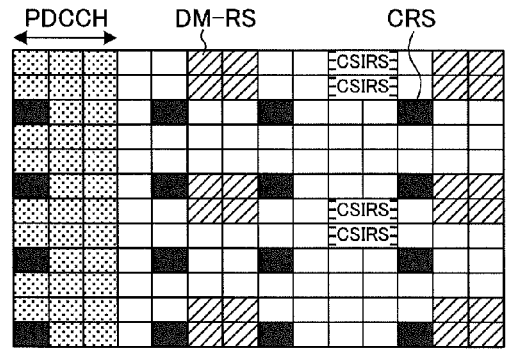

FIG. 6D shows the reference signal arrangement in resource blocks when the fourth communication type is selected. As shown in FIG. 6, the resource blocks when the fourth communication type is selected include all the reference signals that are allocated to the beams formed in the first to third types of communication. That is, by selecting the fourth communication type, it is possible to multiplex and transmit reference signals to be used in a plurality of communication types which the base station supports in the same time. Here, "multiplexing and transmitting in the same time" refers to a concept, which includes multiplexing on and transmitting in common resource blocks.

Figure 7:
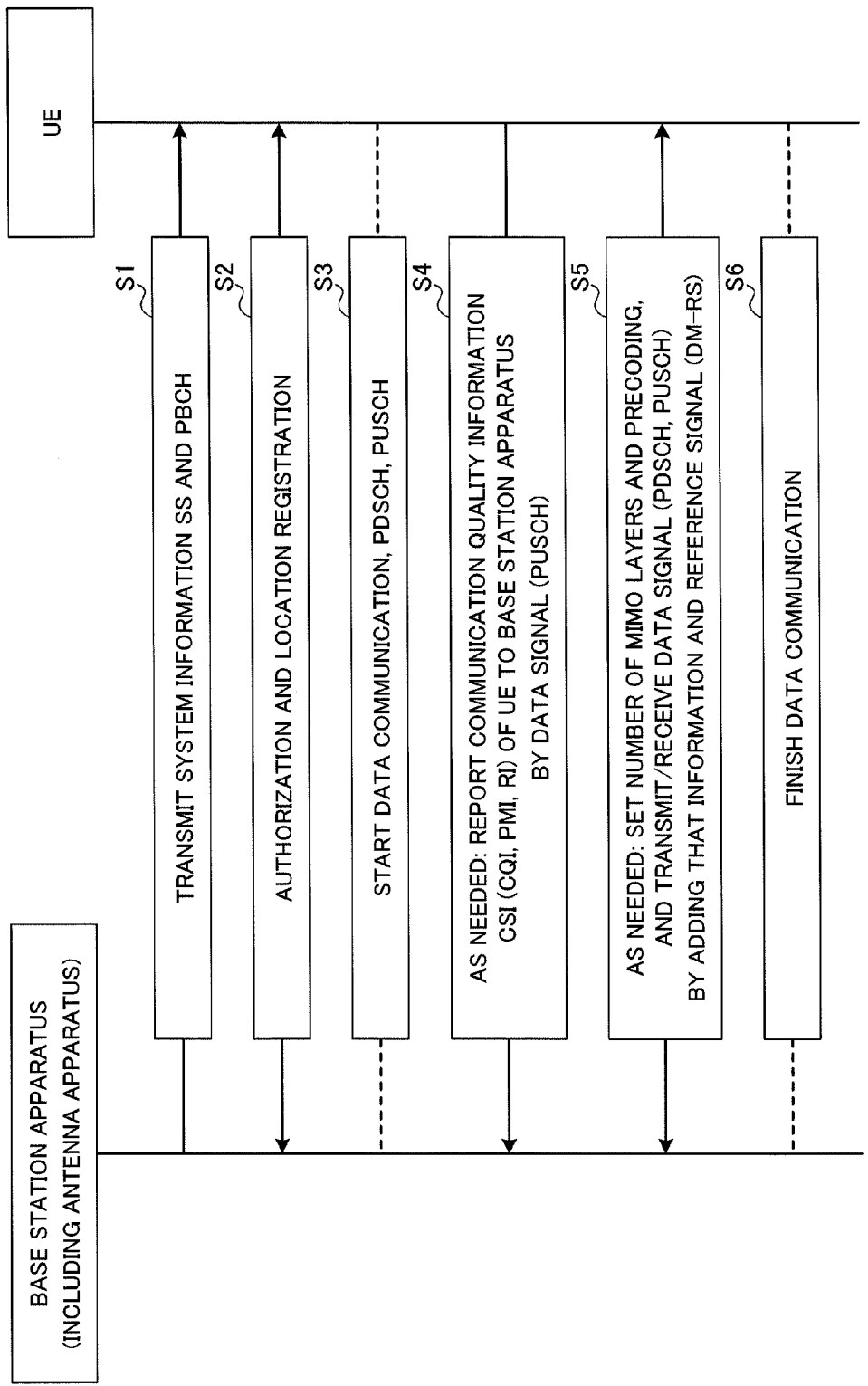
FIG. 7 is a diagram showing a basic sequence between a radio base station and user terminals constituting a radio communication system according to the present embodiment.

Next, the sequence between the base station and user terminals UE in the radio communication system according to the present embodiment will be described. FIG. 7 is a diagram showing the basic sequence between the base station and user terminals UE constituting the radio communication system according to the present embodiment. The "steps" in FIG. 7 shows each phase in the steps of communication. In the following description, the first communication type will be referred to as "communication type 1." Also, the same will apply to the second, third and fourth communication types as well.

(Step 1)

In the phase of starting communication, the base station transmits broadcast information from an antenna apparatus (array antenna 10). The base station transmits a synchronization signal (SS) and a physical broadcast channel signal (PBCH) under the one-antenna branch configuration in which the antenna apparatus supports communication type 1. That is, transmission signal S1, multiplied by the same weight W (W11, W12, W13, W14=1, 1, 1, 1), and also transmission signal S2, multiplied by the same weight W (W21, W22, W23, W24=1, 1, 1, 1) are input in four groups C1 to C4 in the array antenna 10. By this means, it is possible to form one beam having a maximal antenna gain and a minimal beam width.

Note that a case is described here where, in the phase of starting communication, a synchronization signal (SS) and a physical broadcast channel signal (PBCH) are transmitted in communication type 1. However, it is equally possible to change the communication type to select in the phase to start communication as adequate. For example, it is equally possible to select a mix type (communication type 4), which selects communication types 1 to 3 at the same time. In this case, it is possible to reliably transmit the synchronization signal (SS) and the physical broadcast channel signal (PBCH) to a user terminal UE that starts wireless connection with the base station, and also transmit desired reference signals and downlink data signal (PDSCH) to user terminals UE that are already performing data communication.

(Step 2)

Given that the beam formation to support communication type 1 has a wide coverage, a user terminal UE is able to receive the synchronization signal (SS) and the physical broadcast channel signal (PBCH) anywhere in the area. The user terminal UE detects and synchronizes with a cell in the network based on the synchronization signal (SS) received. The user terminal UE decodes the physical broadcast channel (PBCH) received and acquires system information, and connects with the cell (base station) based on the system information. Then, authorization and location registration are performed between the core network and the user terminal via the base station. In this step 2, information about the capacities of the user terminal UE (the LTE release number to support, the maximum number of MIMO transmission layers) and so on are reported to the base station. In this way, after wireless connection is established with the base station, capacity information of a user terminal UE is reported, so that it is possible to reliably learn the capacity information of the user terminal UE in the base station.

(Step 3)

The base station starts data communication with the user terminal UE that is connected by wireless connection. Data communication in the radio communication system is executed via the PDSCH on the downlink and executed via the PUSCH on the uplink.

In step 3, in communication type 4, the base station continues simultaneously transmitting cell-specific reference signals (CRS, CSI-RS) and downlink control signals (PDCCH, PCHICH, PHICH) in all the communication types which the base station supports. For example, when supporting 2×2 MIMO transmission, the base station selects communication type 1 and transmits a CRS and a downlink control signal (PDCCH). When supporting 4×4 MIMO transmission, the base station selects communication type 2 and transmits a CSI-RS for four antenna ports. When supporting 8×8 MIMO transmission, the base station selects communication type 3 and transmits a CSI-RS for eight antenna ports. The base station keeps transmitting reference signals (CRS, CSI-RS) of these communication types at the same time.

When data communication is started, the base station transmits a downlink data signal (PDSCH) to each user terminal UE. Then, the base station determines the communication type according to the capacity information of the user terminals UE that was reported in step 2. For example, when a user terminal UE supports Rel. 8 or Rel. 9 LTE and supports 2×2 MIMO transmission, the base station selects communication type 1 and transmits the downlink data signal (PDSCH). When a user terminal UE supports Rel. 10 or Rel. 11 LTE and supports 4×4 MIMO transmission, the base station selects communication type 2 and transmits the downlink data signal (PDSCH) for four antenna ports and the DM-RS together. When a user terminal UE supports Rel. 10 or Rel. 11 LTE and supports 8×8 MIMO transmission, the base station selects communication type 3 and transmits the downlink data signal (PDSCH) for eight antenna ports and the DM-RS together. These downlink data signals are transmitted to each separate user terminal UE. Consequently, even when user terminals UE that have varying communication types coexist at the same time, control is still possible.

(Step 4)

A user terminal UE generates communication quality information (CSI), on an as-needed basis, based on the reference signals transmitted from the base station, and reports the generated CSI to the base station. When a CRS is transmitted in communication type 1, the user terminal UE generates CSI in response to this CRS, and reports this in a data signal (PUSCH) or an uplink control signal (PUCCH). When a plurality of CSI-RSs are transmitted in communication type 2 or in communication type 3, the user terminal UE generates CSI in response to all of these CSI-RSs, and reports these in a data signal (PUSCH) or an uplink control signal (PUCCH).

(Step 5)

The base station selects the communication type on an as-needed basis based on the CSI reported from the user terminal UE and the capacity information of the user terminal UE reported in step 2, and continues data communication. In this case, resources for transmitting the data signal (PDSCH) to the user terminal UE or for receiving the data signal (PUSCH) from the user terminal UE are allocated, the number of MIMO transmission layers and weight are set, and also the coding rate and so on are updated on an as-needed basis. In this way, the base station selects the type of communication based on CSI that is reported from a user terminal UE and capacity information of the user terminal UE, so that it is possible to reflect the communication quality on the radio communication path between the base station and the user terminal UE and select the desired communication type (weight). Then, the base station makes the antenna apparatus (array antenna 10) reflect the resource allocation for data signal transmission, the number of MIMO transmission layers, the weight, and the coding rate for channel coding. Furthermore, the base station attaches a reference signal (DM-RS) to the data signal (PDSCH, PUSCH) with these pieces of information, and transmits these. The user terminal UE demodulates the data signal (PDSCH) using the user-specific reference signal (DM-RS)).

In step 5, for example, when a user terminal UE supports Rel. 8 or Rel. 9 LTE and supports 2×2 MIMO transmission, the base station selects communication type 1 and performs data communication. Also, when a user terminal UE supports Rel. 10 (transmission mode 9) or Rel. 11 (transmission mode 9) LTE and supports 2×2 MIMO transmission, the base station selects communication type 1 and performs data communication. When a user terminal UE supports Rel. 10 (transmission mode 9) or Rel. 11 (transmission mode 9) LTE and supports 4×4 MIMO transmission, the base station selects communication type 2 and performs data communication. When a user terminal UE supports Rel. 10 (transmission mode 9) or Rel. 11 (transmission mode 9) LTE and supports 8×8 MIMO transmission, the base station selects communication type 3 and performs data communication.

(Step 6)

When data communication is finished, the base station releases the resources allocated to the user terminal UE.

Now, an embodiment of the present invention will be described below in detail with reference to the accompanying drawings. Here, a case of using a base station and mobile station apparatuses to support the LTE-A system will be described.

Figure 8:
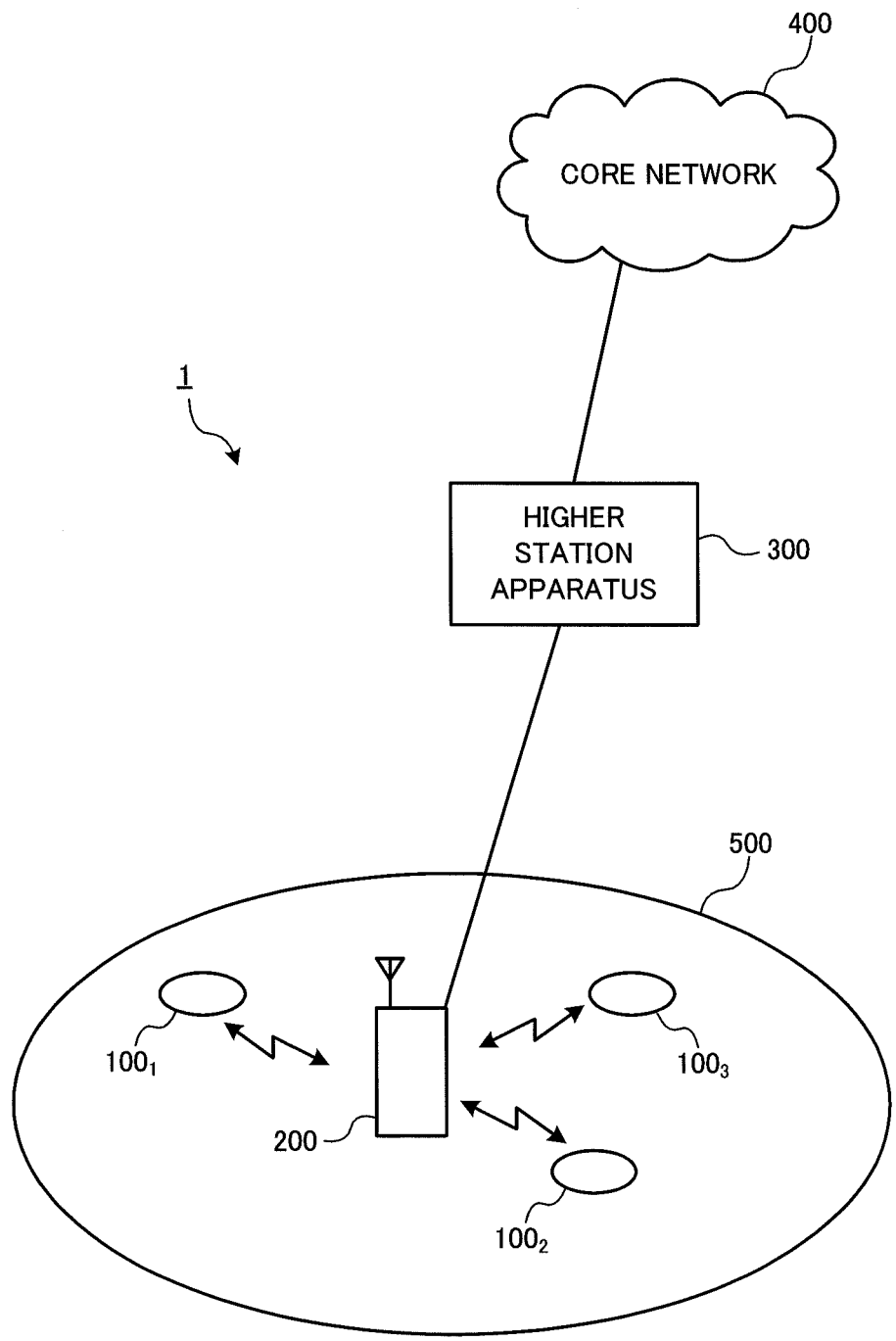
FIG. 8 is a diagram for explaining a configuration of a radio communication system having mobile station apparatuses and a radio base station according to the present embodiment.

A radio communication system 1 having a mobile station apparatus (hereinafter referred to as "mobile station") 100 as a user terminal UE, and a base station 200, according to an embodiment of the present invention, will be described with reference to FIG. 8. FIG. 8 is a drawing for explaining the configuration of a radio communication system 1 having mobile stations 100 and a base station 200 according to the present embodiment. The radio communication system 1 shown in FIG. 8 is a system to accommodate, for example, the LTE system or SUPER 3G. This mobile communication system 1 may be referred to as IMT-Advanced or may be referred to as 4G.

As shown in FIG. 8, the radio communication system 1 is configured to include a base station 200 and a plurality of mobile stations 100 ($100_1$, $100_2$, $100_3$, . . . $100_n$, where n is an integer to satisfy n>0) that communicate with this base station 200. The base station 200 is connected with a higher station apparatus 300, and this higher station apparatus 300 is connected with a core network 400. The user terminals 100 communicate with the base station 200 in a cell 500. The higher station apparatus 300 includes, for example, an access gateway apparatus, a radio network controller (RNC), a mobility management entity (MME) and so on, but is by no means limited to these.

The mobile stations ($100_1$, $100_2$, $100_3$, . . . $100_n$) have the same configuration, functions and state, and therefore will be described below simply as "mobile station 100," unless specified otherwise. Also, although the mobile station 100 will be described to perform radio communication with the base station 200 for ease of explanation, more generally, user terminals, including fixed terminals, may be used as well.

In the mobile communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (sub carriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels in the LTE system will be described. On the downlink, a PDSCH, which is used by each mobile station 10 on a shared basis, and downlink L1/L2 control channels (PDCCH, PCFICH, PHICH) are used. By means of this PDSCH, user data, that is, normal data signals, is transmitted. Transmission data is included in this user data. The component carriers (CCs) and scheduling information allocated to the mobile station 100 in the base station 200 are reported to the mobile station 100 by the L1/L2 control channels.

On the uplink, a PUSCH, which is used by each mobile station 100 on a shared basis, and a PUCCH, which is an uplink control channel, are used. User data is transmitted by means of this PUSCH. Downlink radio quality information (CQI: Channel Quality Indicator) and so on are transmitted by the PUCCH.

Figure 9:
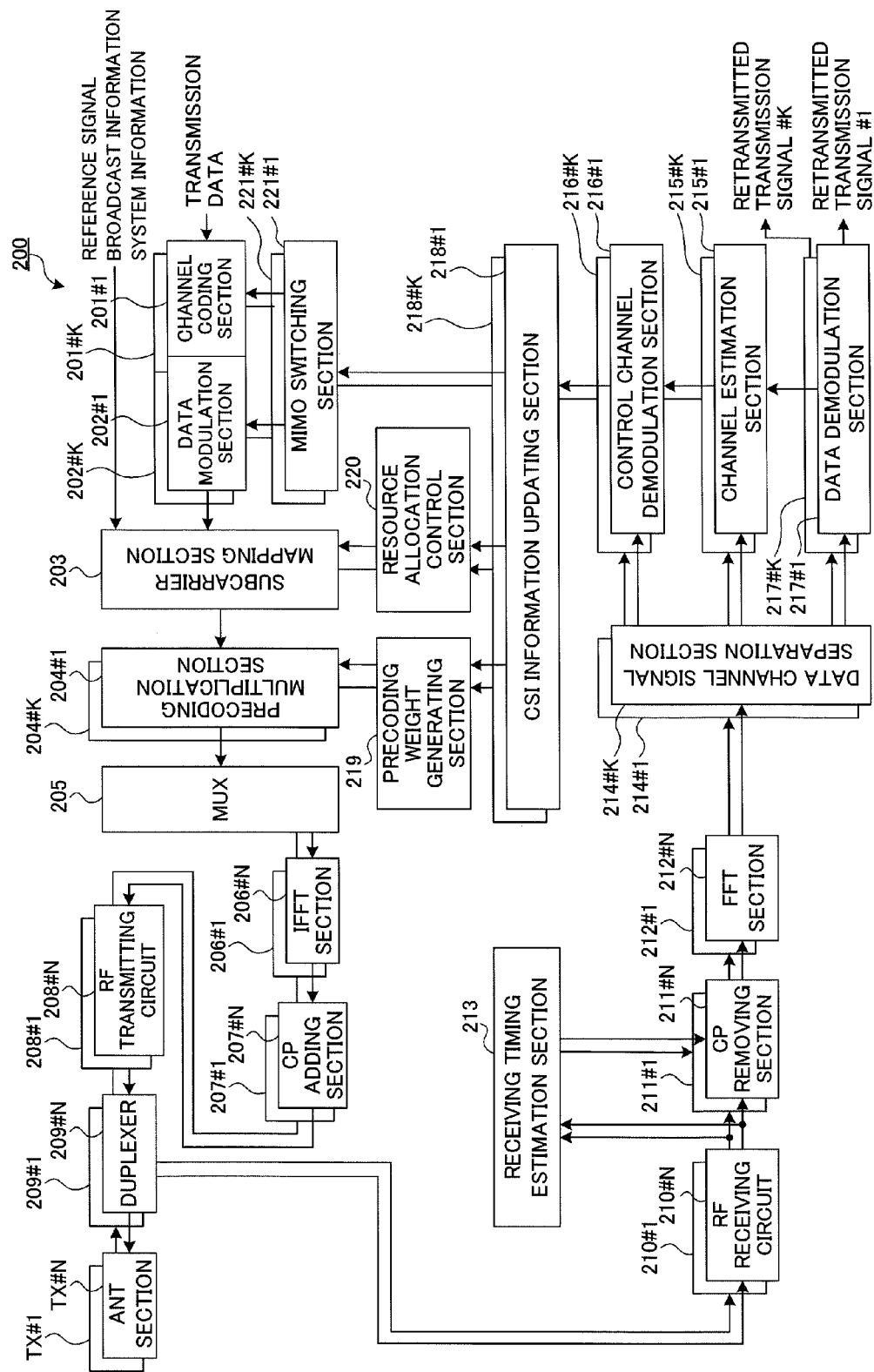
FIG. 9 is a block diagram showing a configuration of a radio base station according to the present embodiment.
Figure 10:
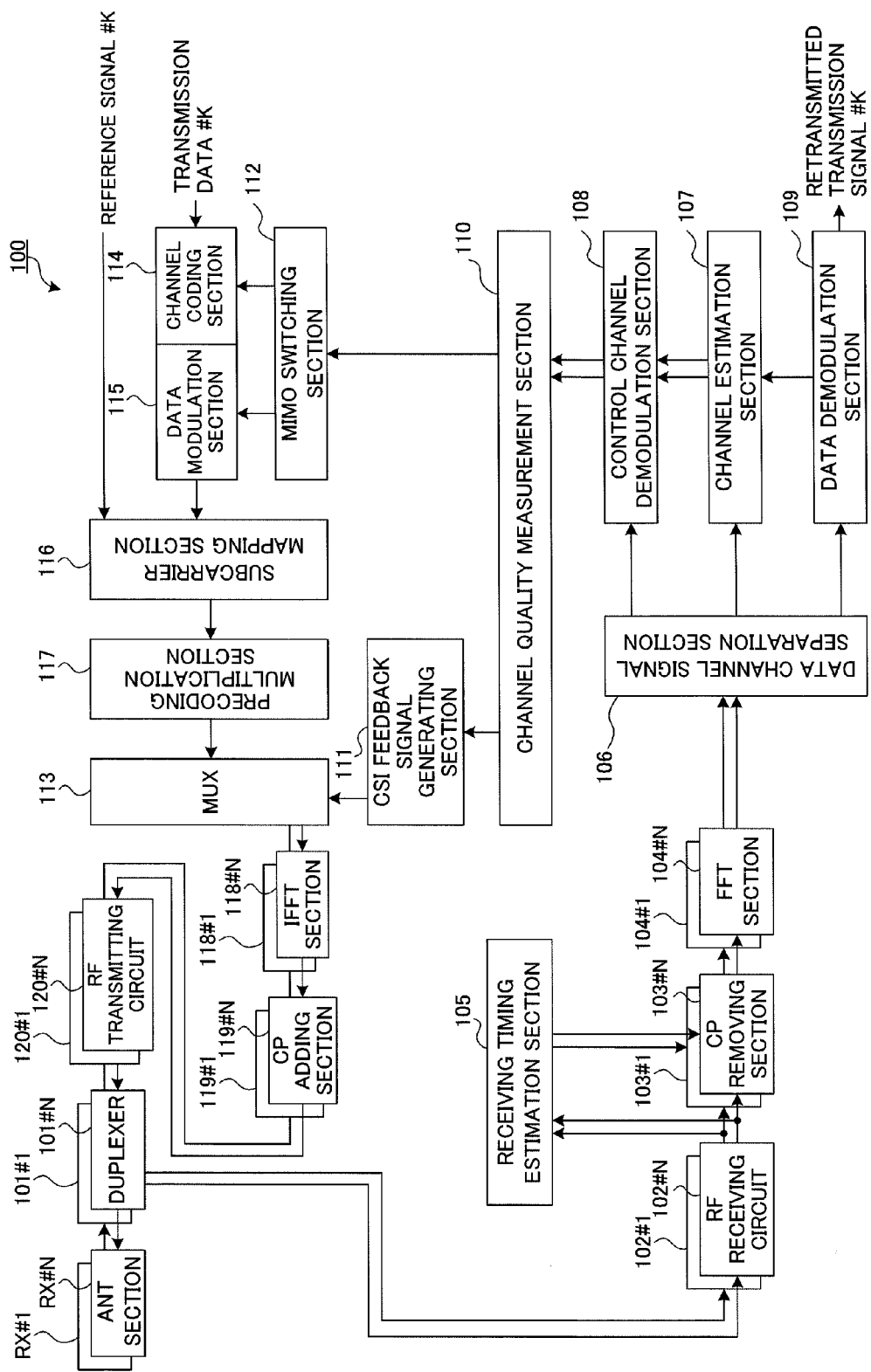
FIG. 10 is a block diagram showing a configuration of a mobile station apparatus according to the present embodiment.

FIG. 9 is a block diagram showing a configuration of the base station 200 according to the present embodiment. FIG. 10 is a block diagram showing a configuration of the mobile station 100 according to the present embodiment. Although the configurations of the base station 200 and the mobile station 100 shown in FIG. 9 and FIG. 10 are simplified to explain the present invention, these have configurations which a normal base station and mobile station should have.

In the base station 200 shown in FIG. 9, a scheduler, which is not shown, determines the number of users to multiplex (the number of users multiplexed) based on the channel estimation values given from channel estimation sections 215 #1 to 215 #K, which will be described later. Then, the details of uplink/downlink resource allocation for each user (scheduling information) are determined, and transmission data #1 to #K to correspond to users #1 to #K are transmitted to corresponding channel coding sections 201 #1 to 201 #K.

Transmission data #1 to #K are subject to channel coding in channel coding sections 201 #1 to 201 #K, and, after that, output to data modulation sections 202 #1 to 202 #K and subjected to data modulation. When this takes place, the channel coding and the data modulation are performed based on the channel coding rates and modulation schemes given from MIMO switching sections 221 #1 to 221 #K, which will be described later. Transmission data #1 to #K, having been subjected to data modulation in data modulation sections 202 #1 to 202 #K, are subjected to an inverse Fourier transform in a discrete Fourier transform section (not shown) and converted from a time sequence signal to frequency domain signals, and output to a subcarrier mapping section 203.

The subcarrier mapping section 203 maps transmission data #1 to #K to subcarriers in accordance with resource allocation information that is given from a resource allocation control section 220, which will be described later. Then, the subcarrier mapping section 203 maps (multiplexes) reference signals #1 to #K that are received as input from a reference signal generating section, which is not shown, and broadcast information and system information that are received as input from a broadcast information generating section and a system information generating section, to subcarriers, with transmission data #1 to #K. By this means, reference signals to match the communication type are allocated to resource elements that are determined in advance. In particular, when the fourth communication type is selected, reference signals to be used in all communication types which the base station 200 supports are multiplexed on the same resource blocks. In this way, transmission data #1 to #K mapped to the subcarriers are output to precoding multiplication sections 204 #1 to 204 #K. The subcarrier mapping section 203 to multiplex a plurality of reference signals to be used in each communication type over the same resource block constitutes a multiplexing section.

Precoding multiplication sections 204 #1 to 204 #K apply a phase and/or amplitude shift to transmission data #1 to #K, for each of transmitting antennas TX #1 to TX #N, based on precoding weights given from a precoding weight generating section 219 (weighting of transmitting antenna TX #1 to transmitting antenna TX #N by precoding), which will be described later. Transmission data #1 to #K, having been subjected to a phase and/or amplitude shift by precoding multiplication sections 204 #1 to 204 #K, are output to a multiplexer (MUX) 205.

In the multiplexer (MUX) 205, transmission data #1 to #K having been subjected to a phase and/or amplitude shift are combined, and transmission signals are generated for each of transmitting antennas TX #1 to TX #N. The transmission signals generated in the multiplexer (MUX) 205 are subjected to an inverse fast Fourier transform in inverse fast Fourier transform sections (IFFT sections) 206 #1 to 206 #N and converted from frequency domain signals to time domain signals. Then, after CPs are attached in cyclic prefix (CP) adding sections 207 #1 to 207 #N, the signals are output to RF transmitting circuits 208 #1 to 208 #N. Then, after a frequency conversion process for conversion to a radio frequency band is applied in RF transmitting circuits 208 #1 to 208 #N, the signals are output to transmitting antennas TX #1 to TX #N via duplexers 209 #1 to 209 #N, and transmitted from transmitting antennas TX #1 to TX #N to the mobile station 100 on the downlink.

The transmission signals output from the mobile station 100 on the uplink are received in transmitting antennas TX #1 to TX #N, electrically separated into the transmitting route and the receiving route in duplexers 209 #1 to 209 #N, and, after that, output to RF receiving circuits 210 #1 to 210 #N. Then, a frequency conversion process for conversion from radio frequency signals into baseband signals is performed in RF receiving circuits 210 #1 to 210 #N. The baseband signals, to which the frequency conversion process has been applied, have the CPs removed in CP removing sections 211 #1 to 211 #N, and then output to fast Fourier transform sections (FFT sections) 212 #1 to 212 #N. The receiving timing estimation section 213 estimates receiving timing from the reference signals included in the received signals, and reports the estimation results to CP removing sections 211 #1 to 211 #N. FFT sections 212 #1 to 212 #N perform a Fourier transform on the received signals that are received as input, and convert the time sequence signals into frequency domain signals. The received signals converted into these frequency domain signals are output to data channel signal separation sections 214 #1 to 214 #K.

Data channel signal separation sections 214 #1 to 214 #K separate the received signals received as input from FFT sections 212 #1 to 212 #K, by, for example, the minimum mean squared error (MMSE) and maximum likelihood detection (MLD) signal separation methods. By this means, the received signals that have arrived from the mobile station 100 are divided into received signals pertaining to user #1 to user #K. Channel estimation sections 215 #1 to 215 #K estimate the channel state from the reference signals included in the received signals separated in data channel signal separation sections 214 #1 to 214 #K, and report the estimated channel states to control channel demodulation sections 216 #1 to 216 #K.

The received signals pertaining to user #1 to user #K, separated by data channel signal separation sections 214 #1 to 214 #K, are demapped in a subcarrier demapping section, which is not shown, and converted back to time sequence signals, and, after that, subjected to data demodulation in data demodulation sections 217 #1 to 217 #K. Then, by executing a channel decoding process in channel decoding sections #1 to #K, which are not shown, transmission signal #1 to transmission signal #K are reconstructed.

Control channel demodulation sections 216 #1 to 216 #K demodulate the control channel signals (for example, the PDCCH) included in the received signals separated in data channel signal separation sections 214 #1 to 214 #K. At this time, based on the channel states reported from channel estimation sections 215 #1 to 215 #K, control channel demodulation sections 216 #1 to 216 #K demodulate the control channel signals corresponding to user #1 to user #K. The control channel signals demodulated by control channel demodulation sections 216 #1 to 216 #K are output to CSI information updating sections 218 #1 to 218 #K.

CSI information updating sections 218 #1 to 218 #K extract the channel state information (CSI) included in each control channel signal (for example, the PUCCH) received as input from control channel demodulation sections 216 #1 to 216 #K, and always update the CSI to the latest state. For example, the CSI includes PMIs, RIs and CQIs. In CSI information updating sections 218 #1 to 218 #K, capacity information of mobile station 200, reported in control channel signals (for example, the PUCCH) and so on are maintained. The CSI information and the capacity information of the mobile station 200 that are held in CSI information updating sections 218 #1 to 218 #K are output to a precoding weight generating section 219, a resource allocation control section 220, and MIMO switching sections 221 #1 to 221 #K.

The precoding weight generating section 219 generates precoding weights that allow the above-described array antenna 10 to form a number of beams to match the type of communication. To be more specific, the precoding weight generating section 219 generates precoding weights to indicate the amounts of a phase and/or amplitude shift for transmission data #1 to #K, based on the CSI and the capacity information of the mobile station 200 received as input from CSI information updating sections 218 #1 to 218 #K. The generated precoding weights are output to precoding multiplication sections 204 #1 to 204 #K, and are used in the precoding of transmission data #1 to transmission data #K.

For example, when the first communication type is selected, the same weight (for example, W11, W12, W13, W14=1, 1, 1, 1), by which the transmission data to be input in each antenna element 11 constituting group A in the array antenna 10 is multiplied, is generated. When the second communication type is selected, the weights (for example, W11, W12, W13, W14=1, 1, 0, 0), by which the transmission data to be input in the antenna elements 11 constituting group B1 in the array antenna 10 is multiplied, are generated, and also the weights (for example, W21, W22, W23, W24=0, 0, 1, 1), by which the transmission data to be input in the antenna elements 11 constituting group B2 is multiplied, are generated. When the third communication type is selected, the weights (for example, W11, W12, W13, W14=1, 0, 0, 0), by which the transmission data to be input in the antenna elements 11 constituting group C1 in the array antenna 10 is multiplied, are generated, and the weights (for example, W21, W22, W23, W24=0, 1, 0, 0), by which transmission signal S2 to be input in the antenna elements 11 to constitute group C2 is multiplied, are generated. At the same time, the weights (for example, W31, W32, W33, W34=0, 0, 1, 0), by which the transmission data to be input in the antenna elements 11 constituting group C3 is multiplied, are generated, and also the weights (for example, W41, W42, W43, W44=0, 0, 0, 1), by which the transmission data to be input in the antenna elements 11 constituting group C4 is multiplied, are generated. When the fourth communication type is selected, weights by which transmission data is multiplied are generated on a per resource element basis.

The resource allocation control section 220 allocates radio resources to downlink signals, which include the capacity information of the mobile station 200 and signal type to match the communication type. To be more specific, the resource allocation control section 220 determines the resource allocation information to allocate to each user based on the CSI and the capacity information of the mobile station 200 received as input from CSI information updating sections 218 #1 to 218 #K. The resource allocation information that is determined by the resource allocation control section 220 is output to the subcarrier mapping section 203 and is used for the mapping of transmission data #1 to transmission data #K.

MIMO switching sections 221 #1 to 221 #K select the MIMO transmission schemes to use for transmission data #1 to transmission data #K based on the CSI and the capacity information of the mobile station 200 received as input from CSI information updating sections 218 #1 to 218 #K. Then, the channel coding rates and modulation schemes for transmission data #1 to transmission data #K to match the selected MIMO transmission schemes are determined. The determined channel coding rates are output to channel coding sections 201 #1 to 201 #K, respectively, and the determined modulation schemes are output to data modulation sections 202 #1 to 202 #K, respectively.

In this way, in the base station 200 according to the present embodiment, a plurality of reference signals (CRS, CSI-RS) in varying communication types are multiplexed in the same time (multiplexed on common resource blocks), so that, even when individual mobile stations 100 perform communication to support separate types of communication, it is still possible to transmit reference signals adequately.

In the mobile station 100 shown in FIG. 10, transmission signals transmitted from the base station 200 are received by receiving antennas RX #1 to RX #N, electrically separated into the transmitting route and the receiving route in duplexers 101 #1 to 101 #N, and then output to RF receiving circuits 102 #1 to 102 #N. Then, a frequency conversion process to convert radio frequency signals into baseband signals is performed in RF receiving circuits 102 #1 to 102 #N. The baseband signals, to which the frequency conversion process has been applied, have the CPs removed in cyclic prefix (CP) removing sections 103 #1 to 103 #N, and, after that, output to fast Fourier transform sections (FFT sections) 104 #1 to 104 #N. The receiving timing estimation sections 105 estimates the receiving timing from the reference signals included in the received signals, and reports the estimation result to CP removing sections 103 #1 to 103 #N. FFT sections 104 #1 to 104 #N perform a Fourier transform on the received signals that are received as input, and convert the time sequence signals into frequency domain signals. The received signals, converted into frequency domain signals, are output to the data channel signal separation section 106.

The data channel signal separation section 106 separates the received signals received as input from FFT sections 104 #1 to 104 #N, by, for example, the minimum mean squared error (MMSE) and maximum likelihood detection (MLD) signal separation methods. By this means, received signals having arrived from the base station 200 are separated into received signals pertaining to user #1 to user #K, and the received signal pertaining to the user of the mobile station 100 (here, user K) is extracted. The channel estimation section 107 estimates the channel state from the reference signals included in the received signals separated in the data channel signal separation sections 106, and reports the estimated channel state to the control channel demodulation section 108. The channel estimation section 107 reports the reference signals included in the received signals separated in the data channel signal separation section 106 to the channel quality measurement section 110.

The received signal pertaining to user #K, separated in the data channel signal separation section 106, is demapped in a subcarrier demapping section, which is not shown, converted back to a time sequence signal, and then demodulated in the data demodulation section 109. Then, a channel decoding process is executed in a channel decoding section, which is not shown, so that transmission signal #K is reconstructed.

The control channel demodulation section 108 demodulates the control channel signals (for example, the PDCCH) included in the received signals separated in the data channel signal separation section 106. When this takes place, in the control channel demodulation section 108, the control channel signal corresponding to user #K is demodulated based on the channel state reported from the channel estimation section 107. Each control channel signal demodulated by the control channel demodulation section 108 is output to the channel quality measurement section 110.

The channel quality measurement section 110 measures channel quality (CQI) based on the reference signals received as input from the channel estimation section 107. Also, the channel quality measurement section 110 selects the PMI and RI based on the CQI measured. For example, when the mobile station 100 communicates in the first communication type, channel quality is measured based on the CRS that arrives from the base station 200. When the mobile station 100 communicates in the second or the third type of communication, channel quality is measured based on the CSI-RS that arrives from the base station 200. Then, the CQI, PMI and RI are reported to a CSI feedback signal generating section 111 and a MIMO switching section 112. Note that the channel quality measurement section 110 constitutes a quality measurement section.

In the CSI feedback signal generating section 111, a CSI feedback signal (for example, the PUCCH) to feed back to the base station 200 is generated. In this case, the CQI, PMI and RI reported from the channel quality measurement section 110 are included in the CSI feedback signal. The CSI feedback signal generated in the CSI feedback signal generating section 111 is output to the multiplexer (MUX) 113. Note that the CSI feedback signal generating section 111 constitutes a feedback information generating section.

The MIMO switching section 112 selects the MIMO transmission scheme to use for transmission data #K based on the CQI, PMI and RI received as input from the channel quality measurement section 110. Then, the channel coding rate and modulation scheme for transmission data #K, to match the selected MIMO transmission scheme, are determined. The determined channel coding rate is output to the channel coding section 114, and the determined modulation scheme is output to the data modulation section 115.

Transmission data #K pertaining to user #K, transmitted from a higher layer, is subjected to channel coding by the channel coding section 114, and then subjected to data modulation in the data modulation section 115. Transmission data #K subjected to data modulation in the data modulation section 115 is converted from a time sequence signal to a frequency domain signal in a serial-to-parallel conversion section, which is not shown, and output to a subcarrier mapping section 116.

The subcarrier mapping section 116 maps transmission data #K to subcarriers in accordance with schedule information that is designated from the base station 200. At this time, the subcarrier mapping section 116 maps (multiplexes) reference signal #K, generated in a reference signal generating section (not shown), to subcarriers, with transmission data #K. Transmission data #K, mapped to subcarriers in this way, is output to a precoding multiplication section 117.

The precoding multiplication section 117 applies a phase and/or amplitude shift to transmission data #K for each of receiving antennas RX #1 to RX #N. Then, the precoding multiplication section 117 applies a phase and/or amplitude shift in accordance with precoding weights that correspond to the PMI that is designated by the control channel signal demodulated in the control channel demodulation section 108. Transmission data #K, having been subjected to a phase and/or amplitude shift by the precoding multiplication section 117, is output to the multiplexer (MUX) 113.

In the multiplexer (MUX) 113, transmission data #K, subjected to a phase and/or amplitude shift, and the control signal generated by the CSI feedback signal generating section 111, are combined, and transmission signals are generated for each of receiving antennas RX #1 to RX #N. The transmission signals generated by the multiplexer (MUX) 113 are subjected to an inverse fast Fourier transform in inverse fast Fourier transform section (IFFT sections) 118 #1 to 118 #N and converted from frequency domain signals to time domain signals, and, after that, attached CPs in CP adding section 119 #1 to 119 #N and output to RF transmitting circuits 120 #1 to 120 #N. Then, after a frequency conversion process to convert into a radio frequency band is performed in RF transmitting circuits 120 #1 to 120 #N, the signals are output to receiving antennas RX #1 to RX #N via duplexers 101 #1 to 101 #N and output from receiving antennas RX #1 to RX #N to the base station 200 on the uplink. The transmission sequence blocks including RF transmitting circuits 120 #1 to 120 #N constitute a transmission section that feeds back a CSI feedback signal that is generated by the CSI feedback signal generating section 111.

The mobile station 100 according to the present embodiment measures channel quality based on reference signals that arrive from the base station 200 in accordance with the communication type in which the subject terminal communicates. Consequently, it becomes possible to adequately feed back channel quality to the base station 200 according to the communication type in which the subject terminal communicates.

As described above, in the radio communication system 1 according to the present embodiment, a plurality of reference signals to be used in varying types of communication are multiplexed in the same time and transmitted from the base station 200, and also channel quality that is measured based on reference signals to correspond to separate types of communication is fed back from the mobile station 100, so that, even when individual user terminals perform communication to support separate types of communication in MIMO transmission to use antennas that have varying antenna configurations depending on the type of communication, it is still possible to execute adequate signaling.

Now, although the present invention has been described in detail with reference to the above embodiment, it should be obvious to a person skilled in the art that the present invention is by no means limited to the embodiment described herein. For example, the number of users and the number of processing sections in the devices in the above-described embodiment are by no means limiting, and it is equally possible to change these as appropriate depending on device configurations. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

For example, a case has been described with the above embodiment where an array antenna 10 is formed with a polarized antenna combining a vertically polarized antenna 10a and a horizontally polarized antenna 10b. However, the configuration of the array antenna to be provided in the base station is by no means limited to this. For example, it is possible to form an array antenna with a polarized antenna having a first polarized antenna and a second polarized antenna that have mutually orthogonal polarized planes. Even when such changes are made, it is still possible to achieve the same advantage as with the above embodiment.

Although a case has been described where an array antenna 10 to provide communication types 1 to 3 is given in a base station that constitutes a radio communication system according to the above embodiment, the antenna configuration is by no means limited to this. For example, it is possible to provide an antenna which has varying antenna configurations between at least two communication types and which can transmit signals to all areas which the base station covers, in the antenna configuration to support communication type 1, which is at least one of them. For example, when the type of communication to support is changed, such as when communication type 1 and at least one communication type are selected in the above embodiment, or when the type of communication is added depending on the combination of antenna configurations, irrespective of the above embodiment, it is still possible to achieve the same advantage as with the above embodiment.

The antenna configuration which can transmit signals to all areas which the base station covers is not limited to communication type 1 of the above embodiment, and any configuration may be used as long as such antenna configuration meets the same conditions.

The disclosure of Japanese Patent Application No. 2011-177606, filed on Aug. 15, 2011, including the specification, drawings and abstract, is incorporated herein by reference in its entirety.

The invention claimed is:

1. A radio communication system comprising a radio base station to form a cell and user terminals to establish wireless connection with the radio base station, wherein:
the radio base station comprises:
an antenna that has varying antenna configurations between at least two types of communication each matching a number of formed beams, and that can transmit signals to all areas which the radio base station covers, by an antenna configuration corresponding to one type of the at least two types of communication;
a resource allocation control section that allocates radio resources to a downlink signal including a signal whose type is based on capacities of a user terminal and the type of communication;
a multiplexing section that multiplexes a reference signal on a resource block;
a precoding weight generating section that generates a precoding weight which allows the antenna to form a number of beams to match the type of communication; and
a precoding multiplication section that multiplies a downlink signal to supply to the antenna by the precoding weight generated by the precoding weight generating section,
wherein the antenna is formed with a plurality of antenna elements that are arranged in a line in vertical direction and that are grouped into at least one group in association with each of the at least two types of communication; and
the user terminal comprises:
a quality measurement section that measures channel quality from the reference signal included in the downlink signal;
a feedback information generating section that generates feedback information pertaining to communication quality using the measured channel quality; and
a transmission section that feeds back the feedback information generated by the feedback information generating section to the radio base station via an uplink,
wherein a mix type of communication that selects the at least two types of communication, including the one type of the at least two types of communication, at the same time, is used as the mixed communication type,
wherein in a phase to start communication, the mixed communication type is selected, and
wherein the multiplexing section multiplexes a plurality of reference signals to use in each communication type on a same resource block.

2. The radio communication system according to claim 1, wherein, in a phase to start communication, the radio base station reports, as the signal type, a downlink signal including at least one of broadcast information and system information to the user terminal, in an antenna configuration to support the type of communication.

3. The radio communication system according to claim 2, wherein the type of communication is implemented by two-beam transmission.

4. The radio communication system according to claim 1, wherein, as the signal type, the radio base station reports a downlink signal including at least one of a control signal, system information, and a reference signal, to the user terminal, in the antenna configuration to support the type of communication.

5. The radio communication system according to claim 1, wherein the type of communication is implemented by two-beam transmission.

6. The radio communication system according to claim 1, wherein, as the signal type, the radio base station reports a downlink signal including a reference signal for four antenna ports, to the user terminal, by four-beam transmission which supports one type of communication in the types of communication.

7. The radio communication system according to claim 1, wherein, as the signal type, the radio base station reports a downlink signal including a reference signal for eight antenna ports, to the user terminal, by eight-beam transmission which supports one type of communication in the types of communication.

8. The radio communication system according to claim 1, wherein, after establishing wireless connection with the radio base station, the user terminal reports an uplink signal including capacity information of the user terminal, to the radio base station, via an uplink.

9. The radio communication system according to claim 1, wherein the radio base station selects the type of communication based on capacity information of the user terminal reported from the user terminal and the feedback information pertaining to communication quality reported from the user terminal.

10. A radio base station comprising:
an antenna that has varying antenna configurations between at least two types of communication each matching a number of formed beams, and that can transmit signals to all areas which the radio base station covers, by an antenna configuration corresponding to one type of the at least two types of communication;
a resource allocation control section that allocates radio resources to a downlink signal including a signal whose type is based on capacities of a user terminal and the type of communication;
a multiplexing section that multiplexes a reference signal on a resource block;
a precoding weight generating section that generates a precoding weight which allows the antenna to form a number of beams to match the type of communication; and
a precoding multiplication section that multiplies a downlink signal to supply to the antenna by the precoding weight generated by the precoding weight generating section,
wherein a mix type of communication that selects the at least two types of communication, including the one type of the at least two types of communication, at the same time, is used as the mixed communication type,
wherein in a phase to start communication, the mixed communication type is selected, and
wherein the multiplexing section multiplexes a plurality of reference signals to use in each communication type on a same resource block.

11. A radio communication method for allowing a user terminal to establish wireless connection and communicates with a radio base station, wherein:
the radio base station has an antenna that has varying antenna configurations between at least two types of communication each matching a number of formed beams, and that can transmit signals to all areas which the radio base station covers, by an antenna configuration corresponding to one type of the at least two types of communication; and the radio base station:

allocates radio resources to a downlink signal including a signal whose type is based on capacities of the user terminal and the type of communication;

multiplexes a reference signal on a resource block;

generates a precoding weight which allows the antenna to form a number of beams to match the type of communication; and multiplies a downlink signal to supply to the antenna by the generated precoding weight; and the user terminal:

measures channel quality from the reference signal included in the downlink signal;

generates feedback information pertaining to communication quality using the measured channel quality; and feeds back the generated feedback information to the radio base station via an uplink, wherein a mix type of communication that selects the at least two types of communication, including the one type of the at least two types of communication, at the same time, is used as the mixed communication type, wherein in a phase to start communication, the mixed communication type is selected, and wherein a plurality of reference signals to use in each communication type are multiplexed on a same resource block.

* * * * *